March 24, 1959     J. W. STEINER     2,878,585
RADIO DIRECTION FINDING CHART RECORDER SYSTEM
Filed Nov. 13, 1953     2 Sheets-Sheet 1
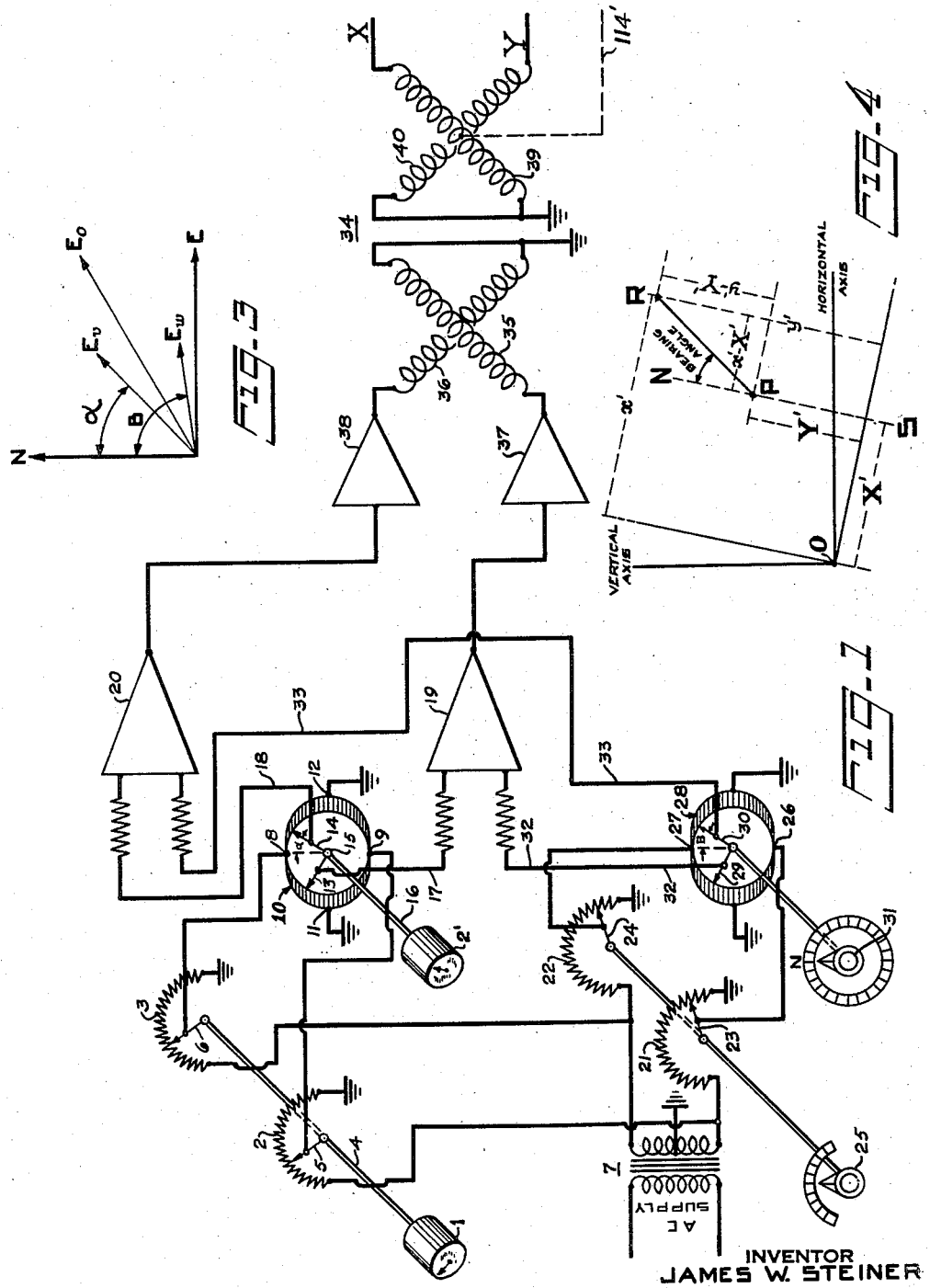
INVENTOR
JAMES W. STEINER
BY
his ATTORNEY

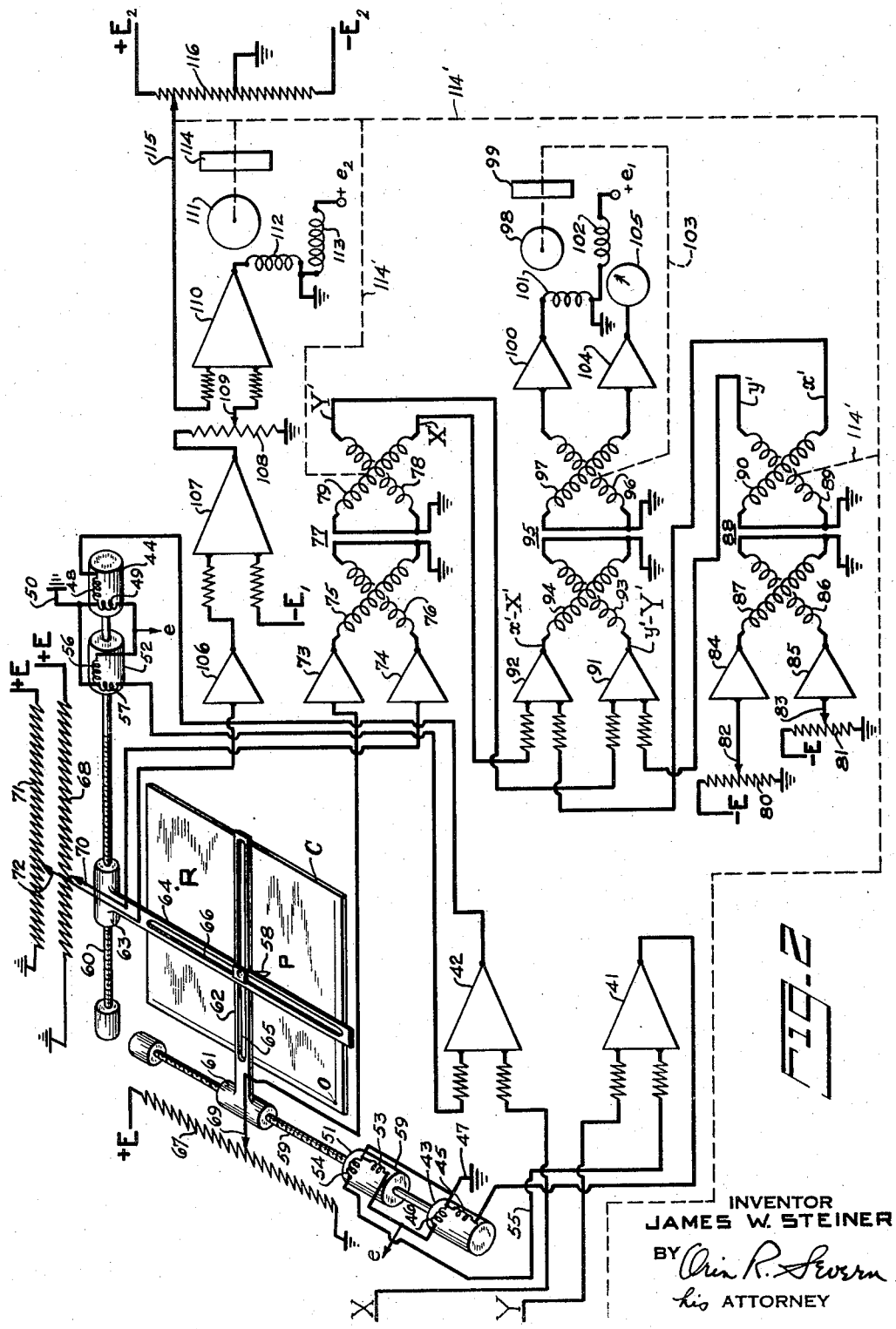

2,878,585

RADIO DIRECTION FINDING CHART RECORDER SYSTEM

James W. Steiner, Upper Montclair, N.J., assignor to Curtiss-Wright Corporation, a corporation of Delaware Application November 13, 1953, Serial No. 392,136

7 Claims. (Cl. 35—10.2)

My invention relates to flight simulating apparatus, and more particularly to apparatus for plotting the ground track of a flight in simulating apparatus and to means for controlling simulator equipment according to the flight path.

It is of course old in the simulator art to provide plotting apparatus for tracing out a flight path in a Cartesian Coordinate system wherein the axes represent North-South, East-West directional lines, or in the equivalent Polar Coordinate system, and to control the operation of flight instruments or equipment for simulating radio range signals according to the flight path. The patents to R. C. Dehmel 2,475,314 issued July 5, 1949, and 2,529,468 issued November 7, 1950, are examples of systems for tracing out a flight path in a Cartesian Coordinate and Polar Coordinate system respectively. While such systems have found widespread application and have proved very useful in the training of pilots a more precise system of even greater usefulness is now contemplated. It is proposed to provide plotting apparatus which will accurately trace a flight path on a radio direction finding chart based on a Lambert conformal projection which is commonly used for purposes of radio navigation and provides a more accurate representation of an area of the earth's surface than can be obtained in a Cartesian Coordinate system or in its equivalent Polar Coordinate system.

The primary difficulty involved in using a radio direction finding chart for recording a flight is that the North-South lines of the chart do not always extend in a vertical direction across the length of the chart, as the angle of meridian tilt which is the angle between a vertical line and the North-South lines of the chart varies continuously in a substantially linear manner across the chart. In order to properly plot a flight on a radio direction chart it is therefore necessary to take into account these changes occurring in the angle of meridian tilt during the course of the flight. Means must also be provided for taking into account changes in the bearing angle due to the fact that the North-South lines are not always vertical if the apparatus is to be useful for accurately controlling simulator equipment according to the flight path.

Accordingly, it is a prime object of my invention to provide apparatus for plotting the flight of an aircraft simulator on a radio direction finding chart taking into account the changes in the angle of meridian tilt over the chart and means responsive to changes in the bearing angle during the flight for rendering the apparatus useful in accurately controlling the operation of simulator equipment.

It is another object of my invention to provide apparatus for plotting the flight of an aircraft simulator on a radio direction finding chart including electrical means for continuously computing the instant angle of meridian tilt during the simulated flight.

It is still another object of my invention to provide in addition to the plotting apparatus of the type described in the foregoing object, voltage deriving means for obtaining during the course of a simulated flight, control quantities determinative of the bearing angle relative to a preselected radio range station for operating simulator equipment.

The invention will be more fully set forth in the following description referring to the accompanying drawings, and the features of novelty will be pointed out with particularity in the claims annexed to and forming a part of this specification.

Referring to the drawings, Figs. 1 and 2 taken together diagrammatically illustrate a system of the type contemplated having the features of my invention incorporated therein.

Fig. 3 is a diagram illustrating vectorially airspeed and wind velocity relative to mutually perpendicular axes of a Cartesian Coordinate system.

Fig. 4 graphically illustrates the factors involved in computing control quantities determinative of the bearing angle over the flight path on the radio direction finding chart.

Reference characters 1 and 2' designate an airspeed meter and compass respectively of an aircraft simulator which instruments are operated in accordance with the simulator flight controls in a manner which is well understood in the simulator art. Disregarding the factor of wind drift, the airspeed and the direction of flight as indicated on these two instruments are determinative of instant velocity vectors for the simulated aircraft during the course of the flight.

As shown in the drawings (Fig. 1), the airspeed meter 1 is operatively connected to a pair of potentiometers 2 and 3 for deriving A.C. voltages corresponding to simulated instant airspeed. The meter 1 is connected to slider contacts 5 and 6 for the potentiometers 2 and 3 respectively. As shown the potentiometer resistances have one pair of terminals connected to the secondary winding of an A.C. supply transformer 7 and the other terminals are grounded. Slider contacts 5 and 6 take off potentiometer voltages whose instantaneous values are of equal magnitude and opposite phase. The slider contact voltages are led to the terminals 8 and 9 of a cosine resolver 10, the other quadrature terminals 11 and 12 of which are grounded. Instantaneous potentials of $\pm E_v$ and $\mp E_v$ are applied respectively at the resolver terminals 8 and 9. The resolver is provided with a pair of sliding contacts 13 and 14 rotatable in fixed space relation of 90° about the center 15 of the resolver for deriving voltages from the potentiometer winding in a manner well-known in the art.

The contacts 13 and 14 of the resolver are operatively connected to the simulated compass 2' by means of a shaft 16. The compass 2' registers the heading of the simulated aircraft, i.e. the angle included by its longitudinal axis and the North reference direction at any given instant. Compass 2' is coupled through the said shaft 16 to the resolver contacts 13 and 14 so as to orient these contacts in accordance with the compass reading. The contacts 13 and 14 are insulated from each other and are connected respectively to conductors 17 and 18 leading to the amplifiers 19 and 20 respectively. The voltages derived at the contacts 13 and 14 and led over conductors 17 and 18 to the amplifiers 19 and 20 represent the instant velocity components of flight in the absence of wind drift as projected on a pair of mutually perpendicular axes defining a Cartesian Coordinate system, with the axes representing North-South and East-West directional lines respectively. In the positions shown the voltage derived at contact 13 is $\pm E_v$ sine $\alpha$ and represents an instant velocity component of flight, absent wind drift, along the East-West directional axes of the said Cartesian Coordinate system, where $\alpha$ is the heading of the aircraft from the fixed North-South axes. The voltage derived at contact 14 is $\pm E_v$ cosine $\alpha$ and represents the instant velocity component along the North-South axes.

The effects of wind drift are introduced into the apparatus in a manner now to be described. Alternating voltage from the secondary winding of transformer 7 is applied to a pair of terminals of potentiometers 21 and 22 having co-acting sliding contacts 23 and 24 respectively arranged for simultaneous movement with respect to the terminals of the potentiometers as in the case of the airspeed potentiometers. The contacts may be adjustably positioned to represent wind velocity by a calibrated dial 25, for example, and are connected as shown to the terminals 26 and 27 respectively of a wind drift resolver 28. The quadrature terminals of resolver 28 are grounded as are the other terminals of the potentiometers 21 and 22 so that when potentiometer contacts 23 and 24 are adjusted to represent wind velocity and the 90° spaced contacts 29 and 30 of the wind drift resolver are adjusted by the dial 31 through an angle to represent the wind direction relative to the North-South axis of the aforesaid Cartesian Coordinate system, the voltages derived at the contacts 29 and 30 will represent the velocity components of wind drift on the North-South and East-West axes of the system. Contacts 29 and 30 are insulated from each other and connected to the conductors 32 and 33 respectively leading to amplifiers 19 and 20. The voltage derived at the contact 29 representing the East-West component of wind drift in the Cartesian Coordinate directional system is $\pm E_w$ sine $\beta$ and the voltage derived at contact 30 representing the North-South component of wind velocity is $\pm$ cosine $\beta$.

Reference is made to the diagram of Fig. 3 which represents the simulated airspeed velocity as $E_v$, the aircraft compass heading as angle $\alpha$, and the wind velocity as $E_w$ and its direction as angle $\beta$. The East-West, North-South components of both the airspeed and wind drift are electrically summed to represent the instant components of ground velocity of the simulated flight by means of the summing amplifiers 19 and 20. This type of amplifier including provisions for "feed-back" is well-known in the art and my invention is not limited to any specific arrangement thereof. The summed velocity components of airspeed and wind drift define the instant velocity $E_r$ of the simulated aircraft in the Cartesian Coordinate system.

It is proposed to utilize the output voltages of the summing amplifiers 19 and 20 representing the airspeed and wind drift components for controlling the operation of plotting equipment to trace out a simulated flight on a radio direction finding chart C (Fig. 2). However, since the summed velocity components define the instant velocity of flight in a Cartesian Coordinate system wherein the axes may be assumed to extend always in a vertical and horizontal direction respectively, adjustment is required by reason of the fact that the North-South lines on a radio direction finding chart are not always vertical and the angle of meridan tilt which is the angle between a vertical line and a North-South line of the radio direction finding chart varies across the length of the chart. Resolving means such as rotary transformer 34 is provided for taking into account the changing angle of meridian tilt during a simulated flight so that the output voltages of the summing amplifiers 19 and 20 may be utilized for operating a chart recorder to accurately plot the flight on a radio direction finding chart.

As shown the output voltages of amplifiers 19 and 20 are led to the primary windings 35 and 36 of resolver 34 through buffer amplifiers 37 and 38 respectively. Primary windings 35 and 36 are arranged in quadrature as are the secondary windings 39 and 40 of the resolver. Although the primary windings 35 and 36 have fixed positions, the secondary windings 39 and 40 are rotatable as a unit in accordance with the angle of meridian tilt over the flight path on the radio direction finding chart. During the course of the flight the secondary windings of the resolver are continuously rotated through an angle $\phi$ under control of computing means hereinafter described for calculating this angle on the basis of a continuing varying angle of meridian tilt during travel in an Easterly or Westerly direction and on the assumption that during a Northerly or Southerly excursion the angle has a substantially constant value. Such computing means controls a motor 111 (Fig. 2) in accordance with the computed angle of meridian tilt $\phi$, and the motor rotates the resolver secondary windings 39 and 40 to a position representing $\phi$ through mechanical connections generally indicated as at 114'. It can be mathematically shown that by reason of the continuous adjustment of the resolver secondary windings 39 and 40 the output voltages of these windings can be used to accurately track the flight course on a radio direction finding chart.

The output voltages of windings 39 and 40 designated as X and Y in the drawings are fed through amplifiers 41 and 42 which include provision for "feed-back" to integrating motors 43 and 44. As shown motor 43 has two phase windings 45 and 46, winding 45 being energized by the output voltage of amplifier 41 and the other winding 46 being energized by a supply voltage $e$ with the common junction of both windings grounded at 47. Similarly motor 44 has two-phase windings 48 and 49 which are respectively energized by the output voltage of amplifier 42 and the supply voltage $e$ with the common junction of the windings grounded at 50. In order to stabilize the motors 43 and 44 so that their speeds accurately represent the output voltages of amplifiers 41 and 42 with which they are connected, each motor shaft is directly coupled to a two-phase generator for supplying a "feed-back" voltage to the respective amplifiers. As shown motor 43 is coupled to the generator 51 and motor 44 is coupled to generator 52. The two-phase windings 53 and 54 of the generator 51 are connected to the supply voltage $e$ and to the conductor 55 which supplies the "feed-back" voltage for amplifier 41. The two-phase windings 56 and 57 of generator 52 are connected to the supply voltage $e$ and to conductor 57 which supplies the "feed-back" voltage for amplifier 42. As shown the two-phase windings of each generator are grounded at the common junction.

The motor generator combinations described hereinabove control the position of a pen 58 to trace out the simulated flight on a radio direction finding chart. Thus motor 43 rotates a lead-screw 59 through the generator 51 at a speed proportional to the output voltage of amplifier 41 and motor 44 rotates lead-screw 60 through generator 52 at a speed proportional to the output voltage of amplifier 42. Lead-screw 59 drives a lead-screw nut 61 including arm 62 and lead-screw 60 drives a lead-screw nut 63 including arm 64 to position pen 58 which is slidably mounted in slots 65 and 66 in the arms 62 and 64 respectively.

Means are provided for computing control quantities during the course of flight determinative of the bearing angle on the radio direction finding chart, such bearing angle being the angle between a North-South line of the chart through the flight position and a line between the aircraft position and a radio range station. The bearing angle is to be distinguished from heading angle previously defined. The radio range station as a general proposition is not necessarily located on the prospective flight course and therefore the bearing angle will generally not be the same as the heading angle.

To the end of computing the required control quantities there is provided a pair of similar integrating resistances 67 and 68 having sliding contacts 69 and 70 respectively which contacts are respectively driven by lead-screw nuts 61 and 63. The terminals of these integrating resistances are connected as shown at corresponding ends to an alternating supply voltage $+E$ and at other corresponding ends to ground. Another integrating resistance 71 is provided having a slider contact 72 driven by the motor 44, such integrating resistance also being connected to the supply voltage +E at one end and to ground at the other end.

The resistors 67 and 68 are disposed parallel to the horizontal and vertical edges of the chart such that when the pen is located at a left hand corner position of the chart O no voltage is derived at the slider contacts 69 and 70 of the resistors, but when the pen is moved either horizontally or vertically to any other position voltages are derived indicative of the pen position. The said corner position O on the chart is hereinafter referred to as the chart origin. The voltages derived at slider contacts 69 and 70 over the course of the flight are utilized to derive control quantities which are determinative of the bearing angle during the flight.

As shown slider contacts 69 and 70 are connected through the amplifiers 73 and 74 to the primary windings 75 and 76 respectively of a resolver 77 which has secondary quadrature windings 78 and 79 arranged for rotation according to the angle of meridian tilt over the simulated flight. As in the case of the resolver secondaries 39 and 40, rotation is accomplished by the motor 111 through the connections 114'. It can be shown that output voltages designated in the drawings X' and Y' of secondary windings 78 and 79 represent distance components of the aircraft as projected on axes extending through the chart origin and respectively parallel to a North-South line through the aircraft position and a line perpendicular thereto, such line being tangent to an East-West line of the chart through the aircraft position. This is graphically illustrated in Fig. 4 of the drawings. It is to be noted that the East-West lines of a radio direction finding chart are curvilinear and always perpendicular to the North-South lines. The position of the aircraft from a radio range station is, of course, of primary importance and its position relative to an arbitrary point as the origin O is only of incidental significance in computing the position with respect to the radio range station. For the purpose of ascertaining the aircraft position with respect to the radio range station there are provided the potentiometers 80 and 81 which are connected at corresponding ends to a negative supply voltage —E and at their other ends to ground. Potentiometers 80 and 81 have slider contacts 82 and 83 respectively which when suitably positioned along the potentiometer windings derive voltages which represent horizontal and vertical coordinates of a radio range station as for example R relative to the origin O. As shown slider contacts 82 and 83 connect through amplifiers 84 and 85 to the primary windings 87 and 86 of resolver 88, such resolver having its secondary quadrature windings 89 and 90 arranged for rotation in accordance with the angle of meridian tilt $\phi$ by means of motor 111 and connections 114', as is also the case for resolver secondaries 39 and 40, and 78 and 79, to take into account the changes in bearing angle due to the changes in the instant location of the simulated flight and due to the change in angle of meridian tilt associated with any given instant location. The output voltages of secondary windings 89 and 90 designated $x'$ and $y'$ in the drawings represent in magnitude the distance components of the selected radio range station from the origin as projected on the aforesaid axes through the origin. It therefore merely becomes necessary to subtract the output voltages of secondary windings 78 and 79 of resolver 77 from the output voltages of secondary windings 89 and 90 of resolver 88 to obtain control quantities which are determinative of the bearing angle at any instant during the simulated flight.

The output voltages Y' and $y'$ of windings 78 and 89 are fed to summing amplifier 91 having an output voltage represented by the quantity $y'-Y'$ and the output voltages X' and $x'$ of windings 79 and 90 are fed to summing amplifier 92 having an output voltage represented by the quantity $x'-X'$. These voltages $y'-Y'$ and $x'-X'$ represent distance components between the aircraft position and radio range station as projected on the instant North-South chart line and a line perpendicular thereto, both through the aircraft position, and are determinative of the bearing angle. Such control quantities can therefore be utilized to advantage in the simulation of radio range signals or for operating simulated flight instruments.

In the form of my invention shown in the accompanying drawings the control quantities $x'-X'$ and $y'-Y'$ are utilized to operate a distance indicator for accurately registering the distance of the aircraft at any point in the simulated flight from the radio range station. Amplifiers 91 and 92 are therefore shown connected to the primary windings 93 and 94 of a resolver 95 having its secondary windings 96 and 97 arranged for rotation as a unit with respect to the primary windings by a two-phase positioning motor 98 through a gear box 99. The motor 98 is energized according to the induced voltage in secondary winding 96 through a motor amplifier 100 the output of which energizes the motor winding 101. The other motor winding 102 is energized by a reference voltage $e_1$ as indicated. The connections are such that the motor tends to rotate through connection 103, the secondary windings of resolver 95 rotate in a direction tending to reduce to zero the voltage induced in winding 96. The positions of these windings therefore represent the bearing angle. It can be shown that the output voltage in 97 is at all times proportional to the distance of the simulated aircraft from the reference radio range station as determined by the positions of the slider contacts 82 and 83 of the potentiometers 80 and 81 respectively and therefore the winding 97 may as shown be connected through an amplifier 104 to a suitably calibrated meter 105 for indicating this distance.

As hereinabove described the resolvers 34, 77 and 88 have their secondary windings rotated in accordance with the angle of meridian tilt which varies over the simulated flight so that suitable means must be provided for calculating this angle of meridian tilt and effecting the rotation of the aforesaid secondary windings. The angle of meridian tilt $\phi$ is computed by solving the equation $\phi=(L/2-X) K \tan \theta$, where L is the length of the chart used, X is the horizontal distance of the aircraft from the origin O, K is a constant having a value determined by the chart length, and $\theta$ is the middle latitude, i. e. the average latitude of the chart. The quantity $L/2-X$ thus represents the horizontal straight line distance on the chart from the central meridian of the chart to the plotted position of the simulated flight. The equation is derived from a consideration of the manner in which the chart is created. It is a modified conic projection formed by projecting points of a globe representing the earth's surface upon a conical surface which intersects the globe on two latitude parallels known as standard parallels. Generally, for equal distribution of scale error these parallels are chosen at ⅙ and ⅚ of the total length of the central meridian. On a radio direction finding chart, such as used for recording the simulated flight, the angle of meridian tilt is positive on the left hand side of the chart, zero in the center, and negative on the right hand side, and the foregoing equation presupposes a linear variation from one side of the chart to the other. The variation although not precisely linear approximates linearity to a degree such that the equation is admirably suited for calculating the meridian tilt.

The means for calculating the angle of meridian tilt include the potentiometer winding 71 which is disposed opposite the length-wise edge of the chart and its slider contact 72 which is positioned by the motor 44 in accordance with the simulated flight path. Slider contact 72 is connected through amplifier 106 to a summing amplifier 107, the output voltage of amplifier 106 being summed in the amplifier 107 with a negative supply voltage $-E_1$. The input voltage to the amplifier 107 from amplifier 106, and the negative supply voltage $-E_1$ respectively represent the horizontal distance of the aircraft during the flight from the origin O and a distance corresponding to one-half the length of the radio direction finding chart used for recording the flight. As shown the output of summing amplifier 107 is fed to one end of the potentiometer 108 and the other end thereof is grounded. Potentiometer 108 is wound so that a tangent $\theta$ function is derived at its slider contact 109 where $\theta$ is the middle latitude of the radio direction finding chart used. It is intended that the slider contact 109 be set manually in accordance with the magnitude of the angle $\theta$ for the particular chart used, the angle $\theta$ being chosen by suitably positioning the slider contact 109 on the potentiometer winding. It can readily be shown that for a simulated flight recordable on a chart having a middle latitude $\theta$, the output voltage of the slider contact continually represents the proper angle of meridian tilt as determined by the aforesaid formula but reversed in sign. The slider contact 109 is connected to a summing amplifier 110 which is used to control servomechanism means including a two-phase motor 111 having a control phase 112 which is energized by the amplifier output as illustrated and having its other phase 113 which is energized by a constant reference A.C. voltage $e_2$. The motor is connected through a gear reduction box 114 to the slider contact 115 of a potentiometer 116 energized at opposite ends by a positive supply voltage $+E_2$ and negative supply voltage $-E_2$ respectively, the potentiometer being connected mid-way between the ends to ground. As shown slider contact 115 connects with amplifier 110 to provide a "feed-back" voltage, the slider contact 115 being continuously operable by the servomotor to a position such that the feed-back voltage at the slider contact 115 is equal and opposite in sign to the input voltage to amplifier 110 at slider contact 109. Thus the voltage derived at contact 115 and the movement of the slider arm represent the angle $\phi$ at the aircraft position. The gear box 114 is operatively connected to the secondary windings of the resolvers 34, 77 and 88 so that the resolvers secondaries are continuously operated according to the angle of meridian tilt $\phi$ by reason of the rotation of motor 111 which is energized by the output voltage of the amplifier 110.

It will now be apparent that I have provided apparatus for plotting the flight of an aircraft simulator on a chart, namely a radio direction finding chart, which is more truly representative of the earth's surface than a Cartesian Coordinate chart. In my system continuous adjustments are made for the changing angle of meridian tilt which occurs across the length of the chart and suitable means are provided for computing control quantities representative of the bearing angle, taking into account the changing angle of meridian tilt which can be utilized for accurately controlling the operation of simulator equipment.

It should be understood that this invention is not limited to specific details of construction and arrangement thereof herein illustrated, and that changes and modifications may occur to one skilled in the art without departing from the spirit of the invention.

What is claimed is:

1. In flight training apparatus equipped with a plotting system for tracing a simulated flight on a radio direction finding chart and wherein the plotting system includes means for calculating the angle of meridian tilt on the chart over the flight path, apparatus for deriving voltages determinative of the bearing angle during the course of the flight relative to a predetermined radio range station, comprising means for deriving voltages representing the distance coordinates of flight on horizontal and vertical axes intersecting at a point defining the chart origin, means for resolving such derived voltages according to the computed angle of meridian tilt at the flight position to obtain voltages representing the distance coordinates of flight on axes parallel to North-South, East-West lines on the chart through the flight position having an origin coincident with the aforesaid chart origin, means for deriving voltages representing the distance coordinates of a preselected radio range station on said horizontal and vertical axes, means for resolving the voltages representing the station coordinates on the horizontal and vertical axes according to the said computed angle of meridian tilt to obtain voltages representing the distance coordinates of the station on the said axes parallel to the North-South, East-West lines through the flight position, and means for subtracting the resolved voltages representing the flight position from the resolved voltages representing the station coordinates to obtain distance components between the flight position and radio range station determinative of the bearing angle.

2. The combination as defined in claim 1 with the addition of means for resolving the said distance components between the flight position and radio range station to obtain a voltage representative of the actual distance between the flight position and station, and an indicator responsive to said voltage for registering said distance.

3. The combination as defined in claim 1 with the addition of resolving means positionable according to the said distance components between the flight position and radio range station to represent the bearing angle in accordance with the position assumed.

4. In flight training apparatus equipped with a plotting system for tracing a simulated flight on a radio direction finding chart and wherein the plotting system includes means for calculating the angle of meridian tilt on the chart over the flight path, apparatus for deriving voltages determinative of the bearing angle during the course of the flight relative to a predetermined radio range station, comprising means for deriving voltages representing the distance coordinates of flight on horizontal and vertical axes intersecting at a point defining the chart origin, means for resolving such derived voltages according to the computed angle of meridian tilt to obtain voltages representative of the directions of the North-South, East-West lines on the chart through the flight position with reference to said origin, means for deriving voltages representing the distance coordinates of a preselected radio range station on said horizontal and vertical axes, and means for resolving the voltages representing the station coordinates on the horizontal and vertical axes according to the said computed angle of meridian tilt to obtain voltages representing the distance coordinates of the station on the said North-South, East-West lines through the flight position, said distance components between the flight position and radio range station determinative of the bearing angle.

5. The combination as defined in claim 4 with the addition of means for resolving the said distance components between the flight position and radio range station to obtain a voltage representative of the actual distance between the flight position and station, and an indicator responsive to said voltage for registering said distance.

6. The combination as defined in claim 4 with the addition of resolving means positionable according to the said distance components between the flight position and radio range station to represent the bearing angle in accordance with the position assumed.

7. In flight training apparatus equipped with a plotting system for tracing a simulated flight on a radio direction finding chart: apparatus for calculating the angle of meridian tilt on the chart over the flight path, said calculating apparatus comprising voltage deriving means for continuously obtaining a voltage proportional to the quantity $-X$, where $X$ is the flight position measured horizontally from one edge of the chart, means for combining said derived voltage and a reference voltage proportional to the quantity $$\frac{L}{2}$$

where L is the length of the chart to obtain a voltage proportional to the quantity $$K\left(\frac{L}{2}-X\right)$$

where K is a predetermined proportionality constant, tangent function generating means settable in proportional relation to the quantity tan $\theta$, where $\theta$ is the middle latitude of said chart, means for energizing said tangent function generating means by said $$K\left(\frac{L}{2}-X\right)$$

voltage to obtain a voltage proportional to the product of $$K\left(\frac{L}{2}-X\right)$$

and of tan $\theta$, said product $$K\left(\frac{L}{2}-X\right)$$

tan $\theta$ being the instant angle of meridian tilt, and servo means operable according to said instant angle of meridian tilt.

References Cited in the file of this patent

UNITED STATES PATENTS

| | | |
|---|---|---|
| 2,393,474 | Jones | Jan. 22, 1946 |
| 2,560,527 | Dehmel | July 10, 1951 |
| 2,569,328 | Omberg | Sept. 25, 1951 |
| 2,829,446 | Cutler et al. | Apr. 8, 1958 |